US009686765B2

(12) United States Patent
Sen et al.

(10) Patent No.: US 9,686,765 B2
(45) Date of Patent: Jun. 20, 2017

(54) DETERMINING AN ANGLE OF DIRECT PATH OF A SIGNAL

(71) Applicant: Hewlett-Packard Development Company, L.P., Houston, TX (US)

(72) Inventors: Souvik Sen, Palo Alto, CA (US); Jeongkeun Lee, Palo Alto, CA (US); Kyu-Han Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/782,856

(22) PCT Filed: Apr. 12, 2013

(86) PCT No.: PCT/US2013/036498
§ 371 (c)(1),
(2) Date: Oct. 7, 2015

(87) PCT Pub. No.: WO2014/168635
PCT Pub. Date: Oct. 16, 2014

(65) Prior Publication Data
US 2016/0073372 A1 Mar. 10, 2016

(51) Int. Cl.
*H04W 4/02* (2009.01)
*H04W 64/00* (2009.01)
(Continued)

(52) U.S. Cl.
CPC ............. *H04W 64/00* (2013.01); *G01S 3/04* (2013.01); *G01S 5/0215* (2013.01); *G01S 5/12* (2013.01); *H04W 4/023* (2013.01)

(58) Field of Classification Search
CPC ... H04W 64/00; H04W 64/006; H04W 4/023; H04W 4/02; H04W 4/008; H04W 8/005;
(Continued)

(56) References Cited

U.S. PATENT DOCUMENTS 8,238,832 B1    8/2012  Zhou
2005/0130677 A1  6/2005  Meunier et al.
(Continued)

FOREIGN PATENT DOCUMENTS

KR    10-0782087 B1    12/2007
KR    10-0977246 B1     8/2010
(Continued)

OTHER PUBLICATIONS

International Search Report and Written Opinion, International Application No. PCT/US2013/036498, Date: Jan. 29, 2014, pp. 1-9.
(Continued)

*Primary Examiner* — Phuoc H Doan
(74) *Attorney, Agent, or Firm* — Hewlett Packard Enterprise Patent Department

(57) ABSTRACT

A signal transmitted from a mobile device is received at a device. A change in angle-of-arrival (AoA) of the signal is computed as the mobile device moves from a first location to a second location. A first distance and a second distance of the mobile from the device corresponding to the first and second locations, respectively are computed. A displacement of the mobile device from the first location to the second location is computed based on mobility information provided by a sensor of the mobile device. A change in an angle of direct path (ANDP) of the signal is computed based on the first distance, the second distance, and the displacement. The ANDP is determined based on a comparison of the change in AoA to the change in ANDP.

17 Claims, 5 Drawing Sheets

(51) Int. Cl.
*G01S 3/04* (2006.01)
*G01S 5/02* (2010.01)
*G01S 5/12* (2006.01)

(58) Field of Classification Search
CPC .... H04W 52/0219; G01S 5/0215; G01S 3/04; H04L 12/44; H04L 5/14; H04L 2012/445
USPC ........ 455/456.1, 456.2, 456.5, 456; 342/387, 342/457, 450, 461
See application file for complete search history.

(56) References Cited

U.S. PATENT DOCUMENTS

| | | |
|---|---|---|
| 2006/0139619 A1 | 6/2006 | Fujii |
| 2006/0240839 A1 | 10/2006 | Chen et al. |
| 2008/0297401 A1 | 12/2008 | Nishida |
| 2008/0311944 A1 | 12/2008 | Hansen et al. |
| 2009/0176507 A1 | 7/2009 | Wu et al. |
| 2009/0227266 A1 | 9/2009 | Baik |
| 2010/0178929 A1 | 7/2010 | Kennedy, Jr. et al. |
| 2010/0302102 A1 | 12/2010 | Desai et al. |
| 2011/0074633 A1 | 3/2011 | Pun et al. |
| 2011/0199263 A1 | 8/2011 | Kang et al. |
| 2011/0223940 A1 | 9/2011 | Zhong et al. |
| 2012/0063340 A1 | 3/2012 | Waters et al. |
| 2012/0083286 A1* | 4/2012 | Kim .................. G06Q 30/0261 455/456.1 |
| 2012/0258729 A1 | 10/2012 | Siomina et al. |
| 2014/0004877 A1* | 1/2014 | Van Diggelen ........... G01S 5/12 455/456.1 |
| 2014/0097988 A1* | 4/2014 | Beauregard ........... G01S 5/0252 342/461 |

FOREIGN PATENT DOCUMENTS

| | | |
|---|---|---|
| WO | WO-2004/032540 A1 | 4/2004 |
| WO | WO-2012/149565 A2 | 11/2012 |
| WO | WO-2013/024278 A1 | 2/2013 |

OTHER PUBLICATIONS

International Search Report and Written Opinion, International Application No. PCT/US2013/036501, Date: Jan. 29, 2014, pp. 1-9.

Souvik Sen et al., "Precise Indoor Localization using PHY Layer Information," Hotnets '11, Nov. 14-15, 2011, Cambridge, MA, USA, pp. 1-6, ACM.

Zengbin Zhang et al., "I Am the Antenna: Accurate Outdoor AP Location using Smartphones," MobiCom '11, Sep. 19-23, 2011, Las Vegas, NV, USA, pp. 1-12, ACM.

European Search Report cited in Appl. No. EP13881625; mailed Oct. 10, 2016; 7 pages.

Sen, S., et al.; "Non-Final Office Action" cited in U.S. Appl. No. 14/783,197; mailed Nov. 18, 2016; 14 pages.

* cited by examiner

DETERMINING AN ANGLE OF DIRECT PATH OF A SIGNAL

BACKGROUND

Extensive interest in location-aware services or location based services (LBS) has driven many indoor localization techniques. For example, crowd-sourced Wi-Fi based localization techniques utilize user input for radio frequency (RF) scene analysis and map construction. Other techniques include expert based site surveys, for example.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
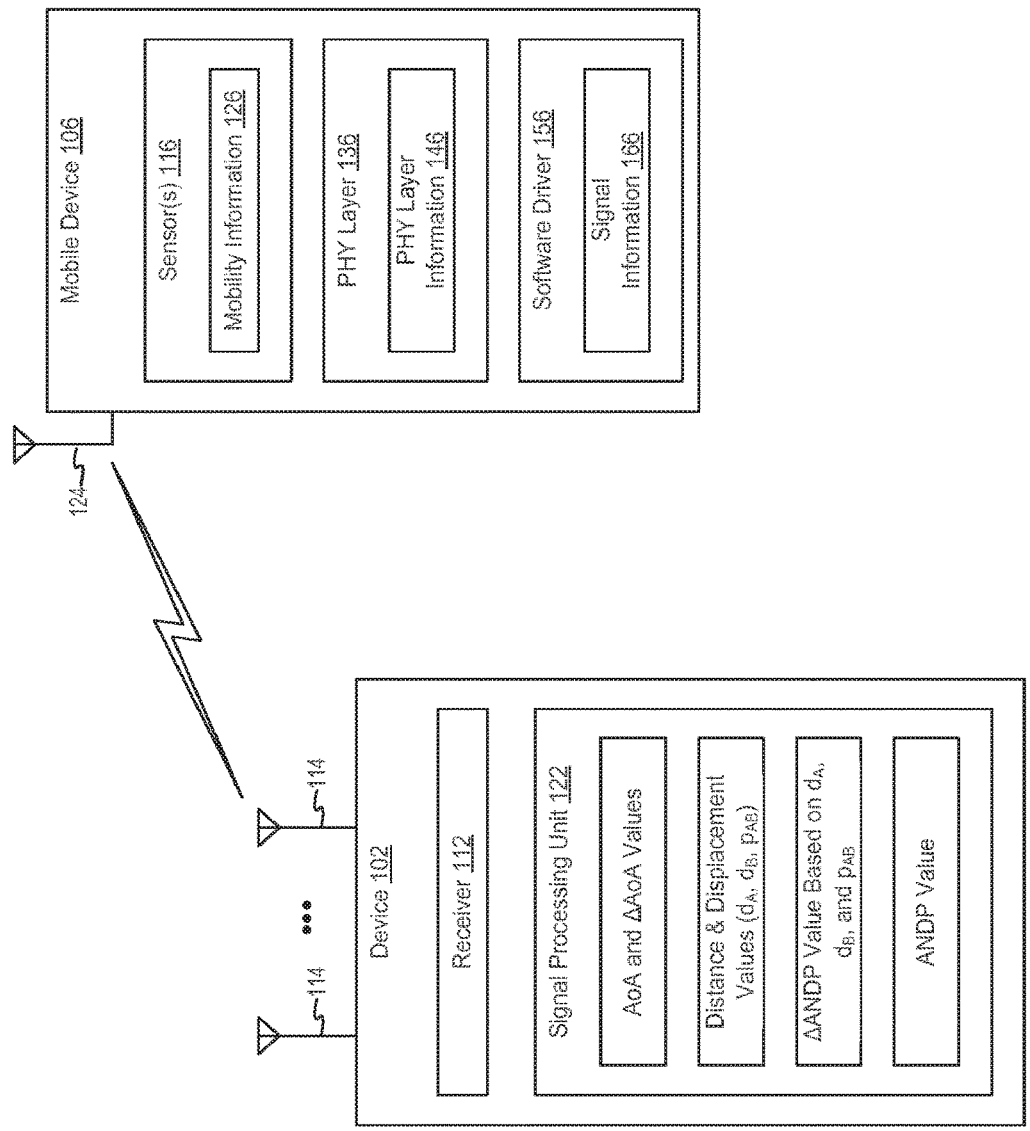
FIG. 1 is a block diagram of a device for determining an angle of direct path of a signal transmitted from a mobile device, according to one example.

A wireless signal traverses in all radial directions, and reflects off walls, furniture, and other objects. Due to reflections, multiple copies of the same signal arrive at the receiver, each undergoing different delay and attenuation, a phenomenon which is commonly referred to as "multipath." However, a direct path is a straight line joining the transmitter and the receiver. Thus, a wireless signal is composed of a direct path and other reflected components, and suffers attenuation as the signal propagates from the transmitter (e.g., the mobile device) to the receiver (e.g., access point (AP) or base station). Indoors, wireless attenuation is mainly caused by path-loss, and multipath reflections.

The angle of direct path of the signal is an important component, especially in Wi-Fi based approaches to determining the location of a mobile device. However, determining the angle of direct path (ANDP) amongst a plurality of angles of reflected paths is rather challenging. With the ANDP and a distance of the mobile device, the location of the mobile device may be determined.

Existing angle-of-arrival (AoA) techniques suffer the problem of being able to discriminate between multipath reflections and the direct path. Received signal strength (RSSI) based estimation techniques suffer similar problems. Whenever the direct path is relatively weak, RSSI or AoA is biased by stronger reflected components, which traverse longer distances, and a different angle than the direct path, thereby leading to errors. For example, indoors, whenever the direct path is blocked, a reflected path may appear stronger at the receiver. In such scenarios, existing techniques may falsely declare the angle of reflected path as the ANDP of the signal transmitted from the mobile device. The reflected path's angle may not have any correlation with the ANDP, ultimately leading to large estimation errors. Thus, while ANDP is a critical parameter in various wireless systems and mobile applications, it has remained difficult to estimate, especially in indoor environments.

Accordingly, examples disclosed herein address the above challenges by distinguishing the direct path from multiple reflections by leveraging mobility information of the mobile device.

In one example, a device includes a receiver to receive a signal transmitted from a mobile device when the mobile device is at a first location and a second location. The device also includes a signal processing unit to compute a change in angle-of-arrival (AoA) of the signal when the mobile device moves from the first location to the second location. The signal processing unit computes first and second distances of the mobile device to the device corresponding to the first and second locations, respectively. The signal processing unit determines a displacement of the mobile device from the first location to the second location based on mobility information provided by a sensor of the mobile device. The signal processing unit computes a change in an angle of direct path (ANDP) of the signal based on the first distance, the second distance, and the displacement. The signal processing unit also determines the ANDP based on a comparison of the change in AoA to the change in ANDP.

In another example, a method for determining an angle of direct path (ANDP) of a signal transmitted from a mobile device includes computing, at an access point (AP), a change in angle-of-arrival (AoA) of the signal as the mobile device moves from a first location to a second location. The method includes computing a first distance and a second distance of the mobile device from the AP when the mobile device is at the first and second locations, respectively. The method includes determining a displacement of the mobile device from the first location to the second location based on mobility information provided by a sensor of the mobile device. The method includes computing a change in the ANDP of the signal based on the first distance, second distance, and displacement. The method also includes determining the ANDP based on a comparison of the change in AoA to the change in ANDP, where determining the ANDP includes identifying the ANDP from a plurality of AoAs that includes at least one angle of reflected path and the ANDP of the signal.

In another example, a non-transitory computer-readable storage medium includes instructions that, when executed by a processor of an access point (AP), cause the processor to receive a signal transmitted from a mobile device when the mobile device is at a first location and a second location. The instructions are executable to compute a change in angle-of-arrival (AoA) of the signal as the mobile device moves from the first location to the second location, and to compute a first distance and a second distance of the mobile device from the AP when the mobile device is at the first location and the second location, respectively, based on information available on at least one of a PHY layer and a software driver of the mobile device. The instructions are executable to compute a distance between the first location and the second location based on mobility information provided by at least one sensor of the mobile device, and compute a change in the ANDP of the signal based on the first distance, the second distance, and the distance between the first and second locations. The instructions are executable to determine the ANDP based on a comparison of the computed change in AoA to the computed change in ANDP, where the ANDP is identified as a particular AoA whose value changes in substantially a same value as the computed change in ANDP.

It is appreciated that examples described herein below may include various components and features. Some of the components and features may be removed and/or modified without departing from a scope of the method, system, and non-transitory computer-readable medium for determining the ANDP of a signal. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example. As used herein, a component is a combination of hardware and software executing on that hardware to provide a given functionality.

Referring to FIG. 1, a block diagram of a device for determining an angle of direct path (ANDP) of a signal transmitted from a mobile device, according to one example, is described. Device 102 can be a base station, a wireless access point (AP), a switch, a router, a hub, or any other device to transmit and receive wireless transmissions from other devices (e.g., mobile device 106). Thus, device 102 may serve as a hub of a wireless network (e.g., Wi-Fi, cellular network). Further, data may be exchanged between device 102 and one or more mobile devices 106 in the form of wireless signals. Accordingly, as used herein "signal" includes data transmission (e.g., data packets).

As shown in FIG. 1, device 102 includes an antenna array comprising at least one antenna 114. Each antenna 114 may be coupled to receiver 112. Receiver 112 may be a transceiver for transmitting and receiving signals from a plurality of mobile devices including mobile device 106.

Mobile device 106 may be a smartphone, a mobile phone, a personal digital assistant (PDA), a portable personal computer, an AIO (all-in-one) computing device, a notebook, a convertible or hybrid notebook, a netbook, a tablet, a cellular device, a desktop computer, a multimedia player, an entertainment unit, a data communication device, a portable reading device, or any other computing device with one or more antennas 124 for transmitting and receiving signals.

Signal processing unit 122 can be hardware and/or software for processing signals received from mobile device 106. Signal processing unit 122 may compute or estimate the angle-of-arrival (AoA) of a signal transmitted from the mobile device 106. A signal transmission from the mobile device 106 may arrive at several angles at the device 102. Thus, signal processing unit 122 may analyze the received signal on multiple antennas 114 to determine an angular component of the signal. To illustrate, signal processing unit 122 may analyze the phase of the received signal, a quality that changes linearly by $2\pi$ for every wavelength ($\lambda$) traversed by the signal. For example, assume a single path exists between the mobile device 106 and the device 102. Further, assume that the device 102 includes two antennas 114 placed at a distance of $\lambda/2$ from each other, and $\theta$ is the angle at which the signal arrives at the two antennas 114. The signal traverses an extra distance before reaching the second (left) antenna. This extra distance ($\Delta d$) can be approximated as:

$$\Delta d = \lambda/2 * \sin(\theta)$$

The extra distance $\Delta d$ will result in a phase difference of ($\Delta\phi$):

$$\Delta\phi = 2\pi \Delta d / \lambda$$

Thus, by observing the phase difference ($\Delta\phi$) of the arriving signal, the AoA may be computed as:

$$\theta = \arcsin(\Delta\phi/\pi)$$

The above example assumes that the arriving signal has only one angular component. It should be noted however that a wireless signal may propagate through multiple paths. AoA estimation techniques can identify the angles of multiple paths by using multiple antennas. Accordingly, using AoA estimation techniques, AoA values for a plurality of paths traversed by the signal, including the direct path and multiple paths due to multipath reflections may be computed. However, AoA estimation techniques may not determine or distinguish which of the computed angles correspond to the angle of direct path (ANDP) of the signal.

Accordingly, signal processing unit 122 leverages mobility information of the mobile device 106 to identify which of the computed AoA values corresponds to the ANDP. To illustrate, as the mobile device 106 moves from a first location to a second location, a number of values related to the signal are computed.

For example, as the mobile device 106 moves from the first location to the second location, a change in the AoA of the signal is computed (e.g., using AoA estimation techniques described above). Further, a first distance and a second distance of the mobile device 106 to the device 102 at the first location and at the second location, respectively is computed. In certain examples, the first and second distances of the mobile device 106 to the device 102 are computed based on information 146 available at a physical (PHY) layer 136 of the mobile device 106. In such examples, the PHY layer information 146 may include, for example, channel state information (CSI), where the CSI includes the energy of the direct path (EDP) of the signal. In other examples, the first and second distances of the mobile device 106 to the device 102 are computed based on information available on a software driver 156 of the mobile device 106. In such examples, the signal information 166 may include received signal strength indicator (RSSI), round-trip time (RTT) of the signal, and time-of-arrival (ToA) of the signal. It should be noted also that the AoA of the signal may be computed based on the CSI.

Still further, the signal processing unit 122 may determine a displacement (e.g., distance) of the mobile device 106 from the first location to the second location based on mobility information provided by one or more sensors 116 of the mobile device 106. For example, the displacement of the mobile device 106 from the first location to the second location may be provided by at least one of an accelerometer, a gyroscope, and a compass of the mobile device 106.

Since the first distance, second distance, and displacement are computed, the signal processing unit 122 may then compute a change in the ANDP of the signal using the values of the first distance, the second distance, and the displacement. It should be noted that this is a change in the ANDP (i.e., $\Delta$ANDP) but not the actual ANDP. To determine the ANDP, the signal processing unit 122 compares the change in AoA to the change in ANDP. For example, signal processing unit 122 compares the AoA at the first location to the AoA at the second location to identify the angle that undergoes a similar change as the computed change in ANDP, and such angle is the ANDP of the signal. To illustrate, at each location of the mobile device 106 (i.e., first and second location), there are a set of AoA values. The ANDP is that particular angle of the set of AoA value that changes from the first location to the second location in substantially the same value as the change in ANDP computed from the distances. Computation of the first distance, the second distance, the displacement, and the change in ANDP are described in further details with respect to FIGS. 2 and 3.

Figure 2:
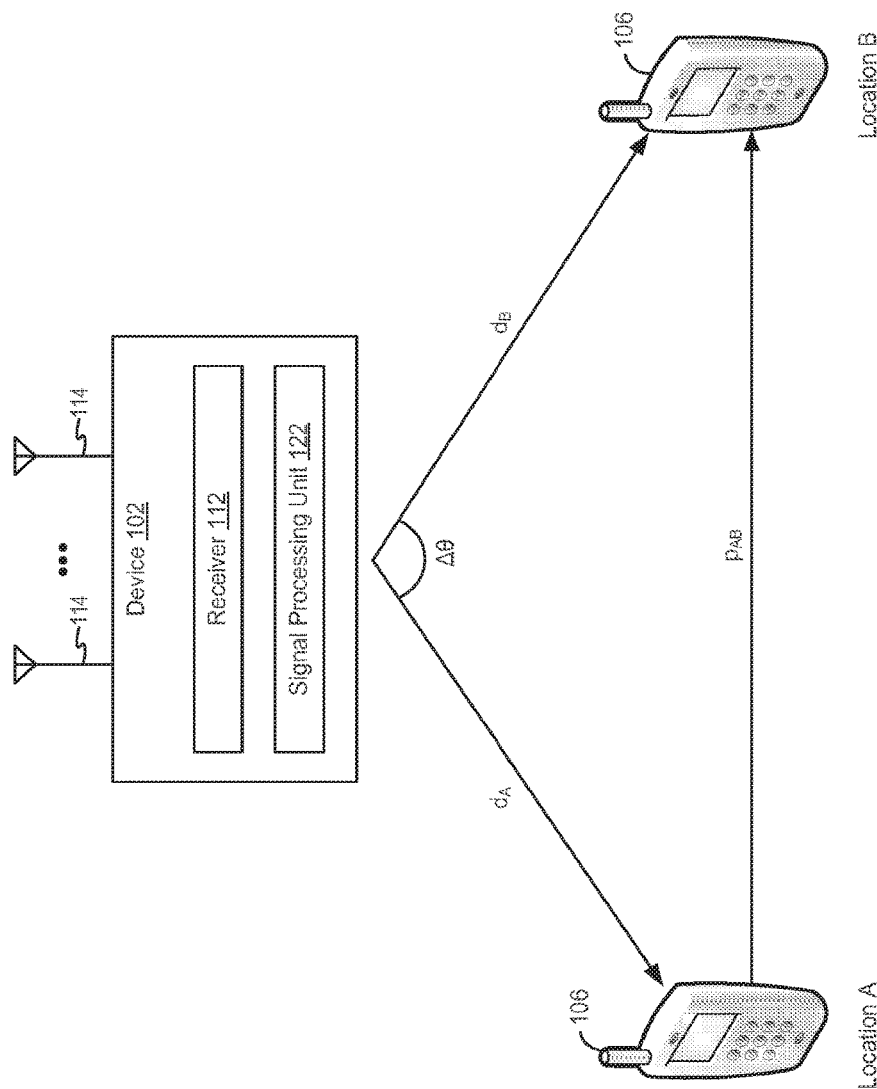
FIG. 2 is a block diagram of a device for determining an angle of direct path of a signal transmitted from a mobile device, according to one example.

FIG. 2 is a block diagram of a device for determining an angle of direct path (ANDP) of a signal transmitted from a mobile device, according to one example. As described above, AoA techniques may be used to estimate the angles at which the signal arrives at the device 102. However, the AoA techniques may not be able to determine which of the angles corresponds to the ANDP. Accordingly, mobility information of the mobile device 106 is used to identify the ANDP from the AoA estimates.

In the example of FIG. 2, as a user of the mobile device 106 walks from location A to location B, the change in ANDP ($\Delta\theta$) is computed. Signal processing unit 122 computes the distance of the mobile device 106, $d_A$ and $d_B$, when the mobile device 106 is at location A and location B, respectively. For example, distances $d_A$ and $d_B$ can be computed based on at least one of PHY layer information of the mobile device 106, RSSI, RTT, and ToA of the signal. If, for example, the PHY layer information is utilized, distances $d_A$ and $d_B$ can be computed based on CSI that includes the EDP of the signal.

In addition, the signal processing unit 122 determines the displacement of the mobile device 106 between location A and B (i.e., $p_{AB}$) by using inertial sensors of the mobile device 106. For example, readings from one or more of an accelerometer, a gyroscope, and a compass may be combined to determine the displacement/distance between the location A and B. Since $d_A$, $d_B$, and $p_{AB}$ are known, the signal processing unit 122 can compute the change in ANDP ($\Delta\theta$). Accordingly, based on the AoA estimates at locations A and B, the angle that undergoes a similar change is identified as the actual ANDP. For example, the signal processing unit 122 compares the change in AoA values between locations A and B to the computed change in ANDP ($\Delta\theta$) described above to identify a particular AoA that has a similar value, as the ANDP.

Figure 3:
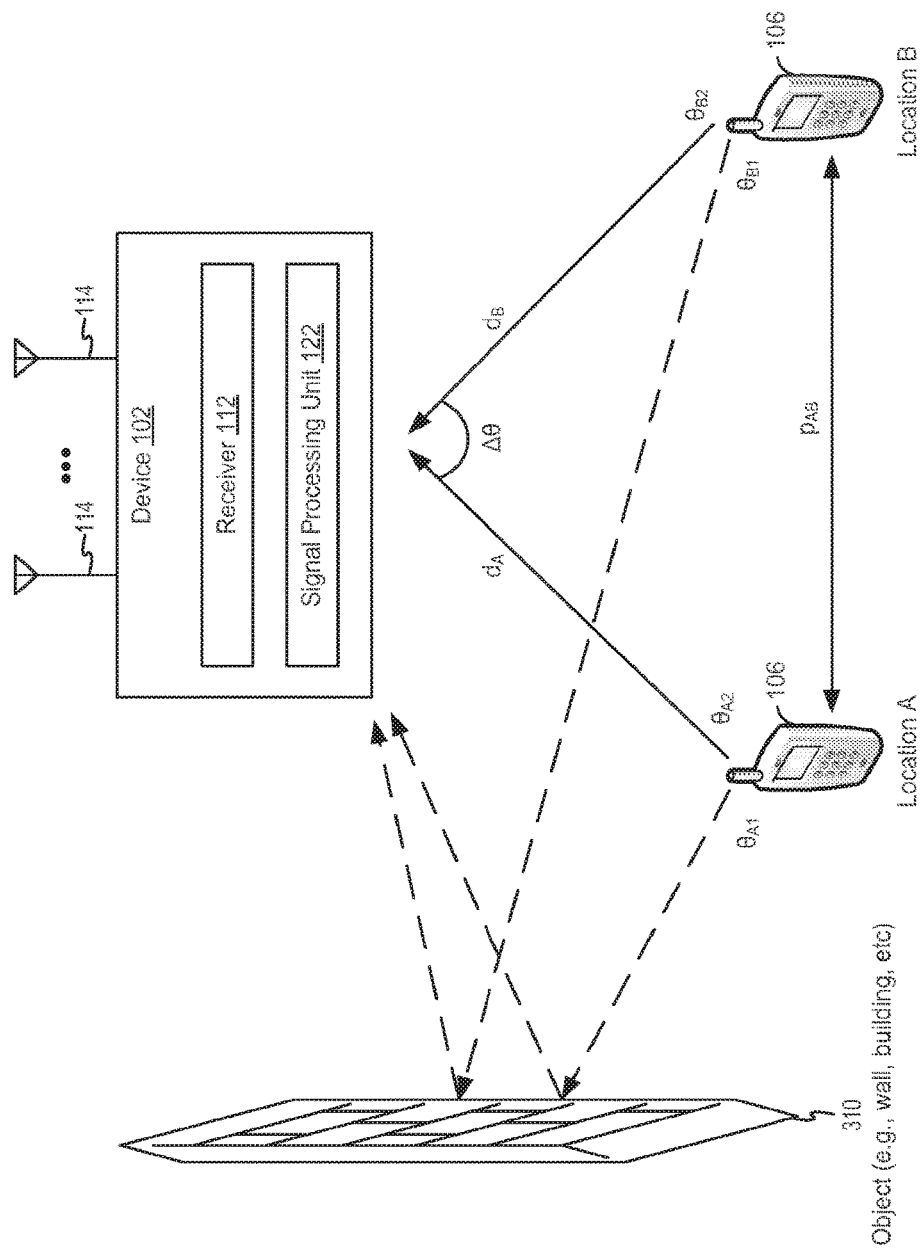
FIG. 3 is a block diagram of a device for determining an angle of direct path of a signal transmitted from a mobile device, according to one example.

FIG. 3 is a block diagram of a device for determining an angle of direct path (ANDP) of a signal transmitted from a mobile device, according to one example. In the example of FIG. 3, the signal transmitted from the mobile device 106 arrives at the device 102 at two different angles, where one component of the signal is due to the direct path and a second component of the signal is due to a reflected path, as shown. For example, the signal may arrive at the device 102 after reflecting off an object 310 such as a wall, building, furniture, etc.

When the user of the mobile device 106 is at location A, the AoA estimate may be $\theta_{A1}$ and $\theta_{A2}$, for example. When the user moves to location B, the corresponding AoA estimate may be $\theta_{B1}$ and $\theta_{B2}$, for example. Assuming also that the signal component which arrives at an angle of $\theta_{A1}$ at location A, incidents at an angle of $\theta_{B1}$ at location B, and likewise for $\theta_{A2}$ and $\theta_{B2}$. Further, assuming the distance estimate of the mobile device at location A and B, be $d_A$ and $d_B$, respectively (e.g., computed based on at least one of PHY layer information, RSSI, RTT, ToA, etc estimates). When the user moves from location A to B, the physical distance between the two locations ($p_{AB}$) may be computed based on mobility information from a sensor of the mobile device, such as an accelerometer, gyroscope, or compass, for example.

Thus, the change in ANDP ($\Delta\theta$) is the angle formed at the device 102 by the signal from the mobile device at the two locations. From the properties of a triangle, $\Delta\theta$ can be computed as:

$$\Delta\theta = \frac{(d_A^2 + d_B^2 - p_{AB}^2)}{2 * d_A * d_B}$$

The angular change of the $i^{th}$ AoA ($\phi_i$), between locations A and B is $\theta_{Bi} - \theta_{Ai}$. Thus, the AoA ($\theta_{Bk}$) which has experienced the same change as the estimated change in ANDP ($\Delta\theta$) can be identified as:

ANDP=$\theta_{Bk}$ for all $i \neq k$, $|\Delta\theta - \phi_k| < |\Delta\theta - \phi_i|$ for all $i$, $\phi_i = \theta_{Bi} - \theta_{Ai}$ To identify the ANDP, the signal processing unit 122 tracks the AoA measured at locations A and B, and the AoA which undergoes the same angular change as the computed change in ANDP ($\Delta\theta$) is the ANDP.

Figure 4:
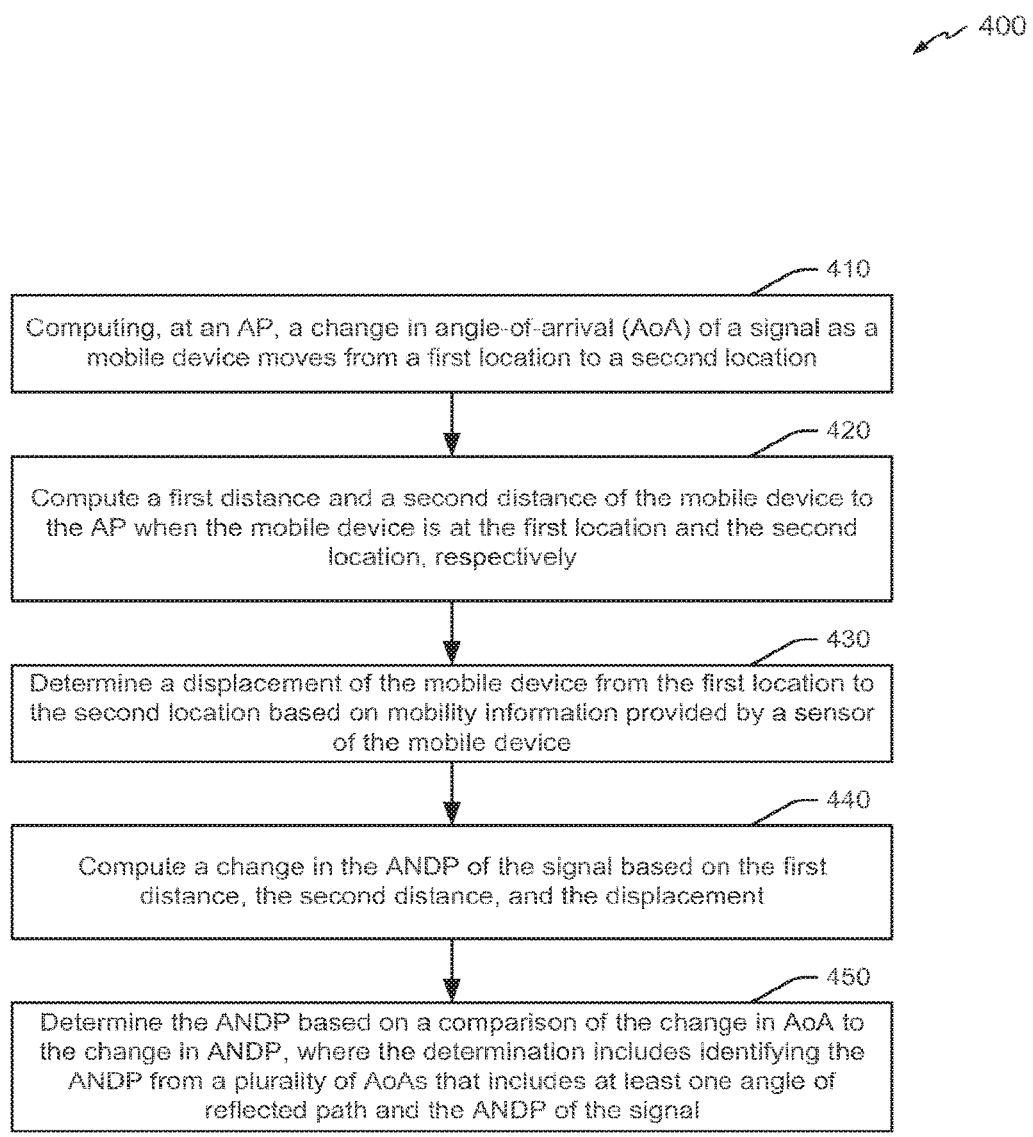
FIG. 4 is a flowchart of a method for determining an angle of direct path of a signal transmitted from a mobile device, according to one example.

FIG. 4 is a flowchart of a method for determining an angle of direct path of a signal transmitted from a mobile device, according to one example. Method 400 may be implemented in the form of executable instructions stored on a non-transitory computer-readable storage medium and/or in the form of electronic circuitry.

Method 400 includes computing, at an access point (AP), a change in angle-of-arrival of a signal as a mobile device moves from a first location to a second location, at 410. For example, receiver 112 of device 102 (e.g., an AP) may receive a signal transmitted from mobile device 106. Signal processing unit 122 may compute the AoA of the signal as the mobile device 106 moves from the first location to the second location. In some examples, the AoA of the signal may be computed based on the CSI of the signal.

Method 400 includes computing a first distance and a second distance of the mobile device to the AP when the mobile device is at the first location and the second location, respectively, at 420. For example, the signal processing unit 122 may compute the first and second distance based on at least one of PHY layer information, RSSI of the signal, RTT of the signal, and ToA of the signal.

Method 400 includes determining a displacement of the mobile device from the first location to the second location based on mobility information provided by a sensor of the mobile device, at 430. For example, signal processing unit 122 may compute the displacement of the mobile device 106 using mobility information provided by at least one of an accelerometer, gyroscope, and compass of the mobile device.

Method 400 includes computing a change in the ANDP of the signal based on the first distance, the second distance, and the displacement, at 440. For example, the signal processing unit 122 may compute the change in ANDP using the computed first distance, second distance, and displacement.

Method 400 includes determining the ANDP based on a comparison of the change in AoA to the change in ANDP, at 450. For example, the signal processing unit 122 may identify the ANDP from a plurality of AoA values that includes at least one angle of reflected path and the ANDP of the signal. For example, the signal processing unit 122 may identify a particular AoA whose change as the mobile device 106 moves from the first location to the second location is substantially equal to the computed change in ANDP.

Figure 5:
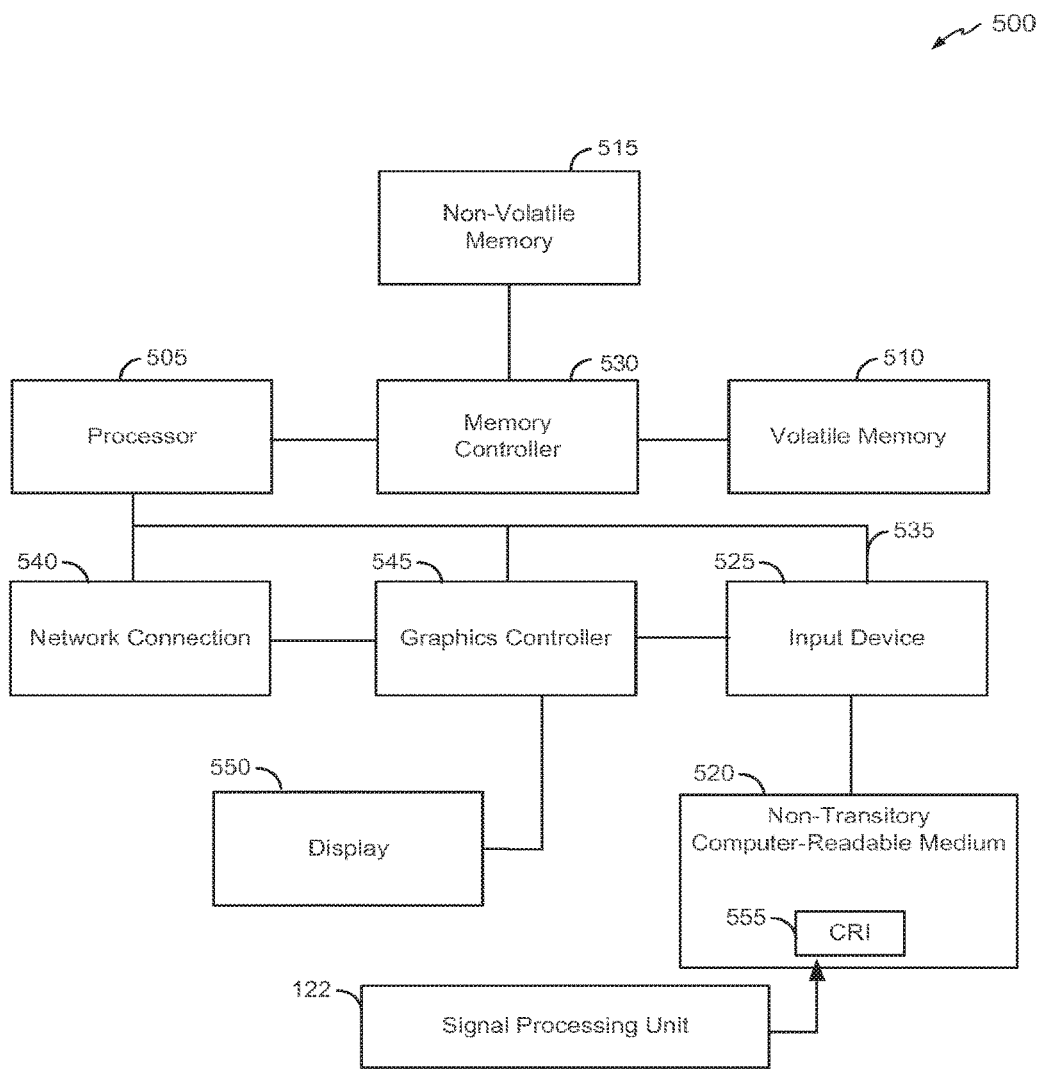
FIG. 5 is a block diagram of an example component for implementing the device of FIGS. 1-3, according to various examples.

The signal processing unit 122 of FIGS. 1-3 can be implemented in hardware, software, or a combination of both. FIG. 5 illustrates a component for implementing the signal processing unit 122 according to various examples. The component 500 can include a processor 505 and memory resources, such as, for example, the volatile memory 510 and/or the non-volatile memory 515, for executing instructions stored in a tangible non-transitory medium (e.g., volatile memory 510, non-volatile memory 515, and/or non-transitory computer-readable medium 520). The non-transitory computer-readable medium 520 can have computer-readable instructions 555 stored thereon that are executed by the processor 505 to implement the functionalities according the present disclosure.

A machine (e.g., a computing device) can include and/or receive a tangible non-transitory computer-readable medium 520 storing a set of computer-readable instructions (e.g., software) via an input device 525. As used herein, the processor 505 can include one or a plurality of processors such as in a parallel processing system. The memory can include memory addressable by the processor 505 for execution of computer readable instructions. The computer readable medium 520 can include volatile and/or non-volatile memory such as a random access memory ("RAM"), magnetic memory such as hard disk, floppy disk, and/or tape memory, a solid state drive ("SSD"), flash memory, phase change memory, and so on. In some examples, the non-volatile memory 515 can be a local or remote database including a plurality of physical non-volatile memory devices.

The processor 505 can control the overall operation of the component 500. The processor can be connected to a memory controller 530, which can read and/or write data from and/or to volatile memory 510 (e.g., RAM). The processor 505 can be connected to a bus 535 to provide communication between the processor 505, the network connection 540, and other portions of the component 500. The non-volatile memory 515 can provide persistent data storage for the component 500. Further, the graphics controller 545 can connect to an optical display 550.

Each component 500 can include a computing device including control circuitry such as a processor, a state machine, ASIC, controller, and/or similar machine. As used herein, the indefinite articles "a" and/or "an" can indicate one or more of the named objects. Thus, for example, "a processor" can include one or more than one processor, such as in a multi-core processor, cluster, or parallel processing arrangement.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. For example, it is appreciate that the present disclosure is not limited to a particular configuration, such as component 500.

Those skilled in the art would further appreciate that the various illustrative modules and steps described in connection with the examples disclosed herein may be implemented as electronic hardware, computer software, or combination of both. For example, the steps of FIG. 4 may be implemented using software modules, hardware modules or components, or a combination of software and hardware modules or components. Thus, in one example, one or more of the steps of FIG. 4 may comprise hardware modules or components. In another example, one or more of the steps of FIG. 4 may comprise software code stored on a computer readable storage medium, which is executable by a processor.

To clearly illustrate this interchangeability of hardware and software, various illustrative components, blocks, modules, and steps have been described above generally in terms of their functionality (e.g., signal processing unit 122). Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

What is claimed is:

1. A device comprising:
   a receiver to receive a signal transmitted from a mobile device when the mobile device is at a first location and a second location;
   a signal processing unit to:
      compute a change in angle-of-arrival (AoA) of the signal when the mobile device moves from the first location to the second location;
      compute a first distance and a second distance of the mobile device to the device corresponding to the first and second locations, respectively;
      determine a displacement of the mobile device from the first location to the second location based on mobility information provided by a sensor of the mobile device;
      compute a change in an angle of direct path (ANDP) of the signal based on the first distance, the second distance, and the displacement; and
      determine the ANDP based on a comparison of the change in AoA to the change in ANDP.

2. The device of claim 1, wherein a particular AoA that changes between the first and second locations in a substantially similar value as the computed change in ANDP is identified as the ANDP.

3. The device of claim 2, wherein the AoA includes at least one angle of reflected path and the ANDP.

4. The device of claim 1, wherein the first and second distances are computed based on at least one of information available at a physical (PHY) layer of the mobile device, received signal strength indicator (RSSI) of the signal, round-trip time (RTT) of the signal, and time-of-arrival (ToA) of the signal.

5. The device of claim 4, wherein the PHY layer information includes channel state information (CSI).

6. The device of claim 1, wherein the sensor of the mobile device includes at least one of an accelerometer, a gyroscope, and a compass.

7. The device of claim 1, wherein the device comprises at least one of a base station, a wireless access point (AP), a cellular base station, a second mobile device, and any computing device comprising a transmitter for transmitting signals.

8. The device of claim 1, wherein the ANDP is usable for performing a plurality of functionalities comprising at least one of localizing a plurality of mobile devices connected to the device, establishing secure connectivity in a network of the device, and admission control of a plurality of mobile devices requesting connection.

9. The device of claim 1, wherein the AoA comprises a set of angles of arrivals corresponding to multiple paths of the signal, the signal processing unit to determine the ANDP based on a comparison of the change in AoA to the change in ANDP by identifying a path from the multiple paths of the signal having a change in angle of arrival that is substantially equal to the change in the ANDP.

10. The device of claim 9, further comprising:
determining the path of the signal corresponding to the angle of the direct path.

11. A method for determining an angle of direct path (ANDP) of a signal transmitted from a mobile device, the method comprising:
computing, at an access point (AP), a change in angle-of-arrival (AoA) of the signal as the mobile device moves from a first location to a second location;
computing a first distance and a second distance of the mobile device to the AP when the mobile device is at the first and second locations, respectively;
determining a displacement of the mobile device from the first location to the second location based on mobility information provided by a sensor of the mobile device;
computing a change in the ANDP of the signal based on the first distance, second distance, and displacement; and
determining the ANDP based on a comparison of the change in AoA to the change in ANDP, wherein determining the ANDP includes identifying the ANDP from a plurality of AoAs that includes at least one angle of reflected path and the ANDP of the signal.

12. The method of claim 11, wherein determining the ANDP comprises identifying a particular AoA whose change as the mobile device moves from the first location to the second location is substantially equal to the computed change in ANDP.

13. The method of claim 11, wherein the first and second distances are computed based on at least one of information available at a physical (PHY) layer of the mobile device, received signal strength indicator (RSSI) of the signal, round-trip time (RTT) of the signal, and time-of-arrival (ToA) of the signal.

14. The method of claim 13, wherein the PHY layer information comprises channel state information (CSI).

15. The method of claim 11, wherein the sensor of the mobile device comprises at least one of an accelerometer, a gyroscope, and a compass.

16. A non-transitory computer-readable storage medium comprising instructions that, when executed by a processor of an access point, cause the processor to:
receive a signal transmitted from a mobile device when the mobile device is at a first location and a second location;
compute a change in angle-of-arrival (AoA) of the signal as the mobile device moves from the first location to the second location;
compute a first distance and a second distance of the mobile device from the AP when the mobile device is at the first location and the second location, respectively, based on information available on at least one of a physical (PHY) layer and a software driver of the mobile device;
compute a distance between the first location and the second location based on mobility information provided by at least one sensor of the mobile device;
compute a change in the ANDP of the signal based on the first distance, second distance, and the distance between the first and second locations; and
determine the ANDP based on a comparison of the computed change in AoA to the computed change in ANDP, wherein the ANDP is identified as a particular AoA whose value changes in substantially a same value as the computed change in ANDP.

17. The non-transitory computer-readable storage medium of claim 16, wherein the AoA includes at least one angle of multipath reflection of the signal and the ANDP, wherein the processor is further to distinguish between the at least one angle of multipath reflection of the signal and the ANDP based on the computed change in the ANDP and the computed change in the AoA.

* * * * *